Oct. 9, 1956     L. R. LOVELL ET AL     2,765,518
METHOD OF PRODUCING ONE-PIECE ROLLER BEARING CAGE
Original Filed April 25, 1951
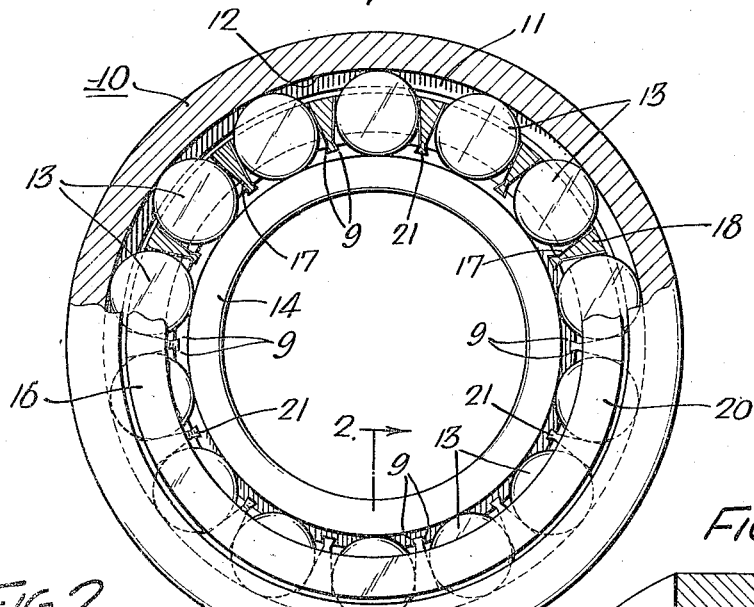
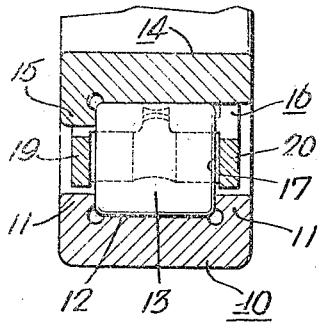
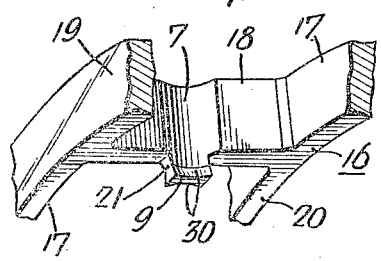
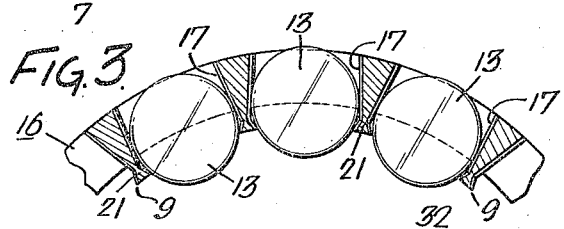
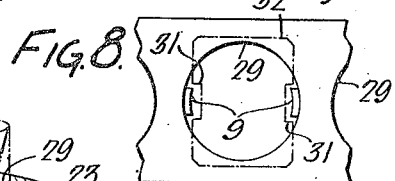
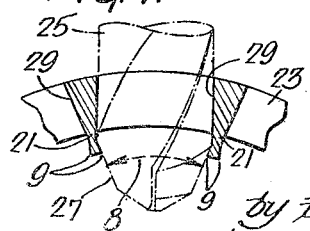
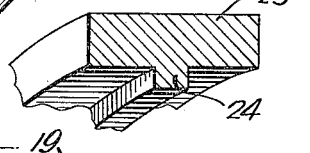

United States Patent Office 2,765,518
Patented Oct. 9, 1956

2,765,518

METHOD OF PRODUCING ONE-PIECE ROLLER BEARING CAGE

Louis R. Lovell and James E. West, Jr., Philadelphia, Pa., assignors to S K F Industries, Inc., Philadelphia, Pa., a corporation of Delaware Original application April 25, 1951, Serial No. 222,864, now Patent No. 2,657,106, dated October 27, 1953. Divided and this application March 12, 1953, Serial No. 348,192

3 Claims. (Cl. 29—148.4)

This application is a division of our co-pending application Serial Number 222,864, filed April 25, 1951, now Patent Number 2,657,106.

The invention relates to a one-piece cage for roller bearings having pockets arranged for radial insertion of rollers into one end and their retention on the opposite end by tangs which project partially across the pocket area to form obstructions.

A principal object of the invention is to provide a novel and highly economical method for producing cages of the type specified.

A more specific object is to provide a method for producing the said cages which employs only the well known drilling and broaching operations conventionally used to form cage pockets of rectangular form, and to thereby avoid the expense of separate bending operations that would normally be used in producing the pocket-obstructing tangs which constitute important functional elements of the cage structure.

The invention will be more readily understood by reference to the attached drawings, wherein:

Fig. 1 is a face view partly in section of a roller bearing equipped with a roller cage made in accordance with the invention;

Fig. 2 is an enlarged sectional view taken along line 2—2 of Fig. 1;

Fig. 3 is a fragmentary enlarged sectional view of the roller bearing cage illustrating the position of the rollers in the cage in a primary stage of assembly;

Fig. 4 is a top plan view of the fragment of the cage shown in Fig. 3 but without the rollers;

Fig. 5 is an enlarged fragmentary sectional perspective view of the roller bearing cage showing certain structural details;

Fig. 6 is a fragmentary sectional perspective view of the annular blank from which the cage is produced;

Fig. 7 is a fragmentary sectional view showing an initial operation in forming one of the roller pockets, and Fig. 8 is a fragmentary plan view illustrating a subsequent broaching operation in the pocket-forming process.

In producing one-piece cages of the type to which the present invention relates, it has been customary first to drill a hole for each roller radially through the outer peripheral surface of an annular blank and then to square these round holes by broaching, the broach preferably being passed simultaneously through two opposite pockets. Use of an odd number of rollers is avoided as far as possible. To assemble the bearing the one-piece cage thus produced is placed inside the flanges of an outer race ring, or outside the flanges of an inner race ring, and the rollers are then inserted radially into the pockets and the race groove. In this operation the race ring is laid flat on its face horizontally to keep rollers from falling out. In this position the rollers stand upright on their ends. Roller bearing cages of this type have been used in industry in tens of thousands, particularly in aircraft where they offer the weight-saving advantages of light metal alloys. The cages have proven very satisfactory in service.

Much annoyance has been experienced, however, when disassembling the bearings for inspection, because of the fact that the rollers frequently fall out of their pockets and become dirty or get lost. To avoid this difficulty fingers were added projecting radially from the side walls of pockets, inwardly or outwardly in accordance with which of the race rings carried the roller retaining flanges, and the ends of these fingers were bent a short distance across the pocket spaces so as to prevent the rollers from falling from the obstructed ends of the pockets. In a bearing having race rings of the form shown in Fig. 2, for example, wherein disassembly requires removal first of the inner single-flanged race rings, the fingers would be placed at the inner periphery of the cage, so that when the inner race ring has been withdrawn the rollers would still be retained in the cage pockets. Rollers will not readily fall out of a cage kept flat in horizontal position with both races removed so long as the rollers are kept in positions close to the obstructions. One-piece roller cages so equipped are desirable but add materially to costs because of the additional machining and labor required to bend obstructions to operative roller-retaining positions. In many instances multiple bending operations are required. For some forms of bearing the ends on the fingers are necessarily thin, while for others the ends are thick. Some thin ends prove too weak to keep rollers in position; and most of the thick ends crack or break off entirely in the bending operation. This invention eliminates both of these difficulties.

The present invention provides a method for forming fingers on the side walls of the pockets, whose ends form tangs which will obstruct the pocket spaces sufficiently to accomplish retention of the rollers, said method involving use only of a drill and a broach as in the production of original one-piece fingerless roller cages. The invention provides thoroughly satisfactory cages of improved characteristics at considerably reduced costs.

The invention will be more readily understood by reference to Figs. 1 and 2 which show a roller bearing having a cage constructed in accordance with our novel principle. The bearing comprises an outer race ring 10, an inner race ring 14, and the aforesaid cage 16 having pockets for the plurality of rollers 13. In the present instance, the outer ring 10 is formed with axially spaced inner flanges 11, 11 which form therebetween a race 12 for the said rollers. The inner ring 14 is formed in the present instance with an outwardly projecting flange 15 which defines one side of the inner ring roller race. In some installations the flange 15 may be omitted. The cage 16 which lies between the rings consists of an annular body member containing a plurality of circumferentially spaced generally rectangular radial pockets 17 separated by crossbars 18 and bounded at the sides by the annular side portions 19 and 20, as best illustrated in Fig. 4. The pockets 17 receive the rollers as previously set forth, and in the assembled bearing the cage rides on the flanges 11 of the outer race ring, as shown in Figs. 1 and 2, and retains the rollers in properly spaced and aligned positions between the rings. The cage 16 is made in one piece, and each of the crossbars 18 has a radially projecting central finger 21 the extremity of which is offset circumferentially of the cage for a purpose now to be described.

In assembling the bearing, the cake 16 is laid flat on the assembly table, and the individual rollers 13 are then inserted into the pockets 17 from the outer ends thereof, the rollers being moved inwardly until stopped by the offsets 9 at the inner ends of the fingers 21, the rollers then occupying the positions shown in Fig. 3. In this position the rollers lie within or project only slightly beyond the outer peripheral surface of the cage which is of lesser diameter than the inner peripheries of the outer ring flanges 11, so that the ring 10 may be placed around the cage and roller assembly on the table. The rollers are then displaced radially outwardly into the race 12 of the ring 10, as shown in Fig. 1, thereby permitting insertion of the inner ring 14 into the cage 16 to the position shown in Fig. 2, completing the assembly operation. It is apparent that the same procedure may be used in reverse for disassembly, escape of the rollers from the cage 16 when the ring 14 is withdrawn from the bearing being precluded by the offsets 9 of the fingers 21.

Cages of this general form are not new in the art and their mode of assembly in the bearings are well understood. Novelty resides, however, in the form of the roller-retaining offsets 9 and the manner in which they are produced, as hereinafter fully described.

In fabricating the cage in accordance with the invention, an annular blank 23 of solid metal is employed, see Fig. 6, having boundary dimensions suitable for finishing all over. In this blank is drilled a series of radial holes 29, one for each of the rollers of the bearing. In the present instance the holes are drilled inwardly from the outer peripheral surface of the blank. The drill 25, shown in broken lines in Fig. 7, has a conical end 27, and suitable stop means (not shown) limits the drilling operations so that in its most advanced position the drill will occupy a position in the cage blank, illustrated in Fig. 7, wherein the conical end 27 will not have passed completely through the rib 24 on the inner periphery of the blank. The metal thus left on the sides of the fingers 21 at the inner ends of the bores constitutes the offsets or tangs 9 previously mentioned, and the included angle 8 of the conical end 27 of the drill determines the taper of the conical surfaces 30 of the tanks. At this stage, the drilled holes 29 will appear from the outside as shown in Fig. 8, the tangs 9 projecting into the bore of the hole at the inner end of the latter.

The cage must have rectangular pockets to accommodate the rollers, and the next step consists of a broaching operation, or operations, wherein the cylindrical holes formed by the drill are changed into the required rectangular pockets whose lengths parallel to the axis of the cage approximates the length of the rollers, and whose widths approximate the diameter of the rollers. It will be noted by reference to Fig. 8 that the width of the broach, as indicated in broken lines, is somewhat less than the diameter of the drill 25, so that the faces of the crossbars 18 between the broached pockets exhibit recesses 7 which are portions of the drilled holes left by the broaching operation. It will be noted also that the recesses 7 are wider than the fingers 21, this greater width functioning for a purpose described below.

As indicated in Fig. 8, the broach is provided at each side with a recess 31 which is wider than the fingers 21 and deeper than the radial extent of the tangs 9. These recesses are necessary in order that the broach may clear the tangs 9 and leave them intact. The recesses 31, however, are of lesser width than the chord width of the recess 7 in crossbars 18, which means that when the broach is passed through the blank the edges of the recesses 31 will overlap the drilled hole and lie within the latter, thus affording a smooth rectangular roller pocket.

In effect the method entails the use of a drill larger than required as a preparation for broaching to the required pocket dimensions and coned at the end so as to leave a tang as described which projects a little way across an end of the pocket space; then forming a rectangular pocket by pulling through the drilled hole, a broach (one or more as required) having notches which clear the tang entirely, said broach being less in width than the diameter of the drill so as to leave depressions in the sides of the broached hole in line with and of greater chordal width than the tangs, the teeth of the broach overlapping the edges of the depressions to avoid burrs. Obviously, a square pocket, suitable for rollers whose lengths equal their diameters, would have depressions in end as well as in side walls of the pockets.

The function of the tangs 9 has been made clear in the description above of the mode of assembling and disassembling the bearing. It will be apparent that the invention affords an extremely simple and relatively inexpensive method of producing cages of the type involved solely by conventional drilling and broaching operations and without subsequent bending operation.

While the foregoing description and the accompanying drawings disclose a cage with internally projecting roller-retaining fingers, the invention embraces also a cage with externally projecting fingers similarly formed for use in roller bearings where the inner ring is provided with an inset race of the character of race 12 of outer ring 10 described above, and where the outer ring is unflanged or provided with a single internal flange similar to the flange 15 of the inner ring 14 of the previously illustrated embodiment.

We claim:

1. In the manufacture of a one piece cage for roller bearings from a solid annular blank having a circumferential flange projecting at one periphery between the side faces of the blank, the method which comprises drilling the blank from the other periphery with a drill having a tapered cutting surface behind its point to form a circumferential series of cylindrical radial holes intersecting both of said peripheries and said flange, interrupting the drilling operations before the said tapered surface has passed entirely through the flange so as to leave integral portions of the flange projecting as tangs into the bores of said holes, and subsequently broaching each of the holes at each side of the tangs so as to convert said holes to generally rectangular form of a size sufficient to receive an individual roller bearing while leaving the said tangs intact as obstructions at one end of the respective rectangular pockets thus formed.

2. The method of claim 1 wherein two opposite sides of the broach are provided with grooves affording clearance between the broach and the tangs in the broaching operation.

3. The method of claim 2 wherein the diameter of the drill is sufficiently greater than the width of the broach between the said grooved sides to leave concaved recesses in the walls of the broached holes of greater width than the said grooves, said recesses and grooves being registered so that the sides of the recesses overlap and lie beyond the corresponding side edges of the grooves.

References Cited in the file of this patent

UNITED STATES PATENTS

| | | |
|---|---|---|
| 1,318,092 | Lockwood | Oct. 7, 1919 |
| 1,376,709 | Lapointe | May 3, 1921 |
| 1,668,112 | Gibbons | May 1, 1928 |
| 1,915,288 | Bott | June 27, 1933 |
| 1,983,134 | Johnson | Dec. 4, 1934 |
| 2,327,237 | Baden | Aug. 17, 1943 |
| 2,409,236 | Banker | Oct. 15, 1946 |